(12) United States Patent
Wieczorek et al.

(10) Patent No.: US 7,850,845 B2
(45) Date of Patent: Dec. 14, 2010

(54) FILTER WITH INSTALLATION INTEGRITY AND MAGNETIC FLOW-CONTROL

(75) Inventors: Mark T. Wieczorek, Cookeville, TN (US); Chad M. Thomas, Algood, TN (US); Mark V. Holzmann, Stoughton, WI (US); Peter K. Herman, Stoughton, WI (US); Jeffrey A. Husband, Cookeville, TN (US); Hendrik N. Amirkhanian, Cookeville, TN (US); Michael J. Connor, Stoughton, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 0 days.

(21) Appl. No.: 12/576,378

(22) Filed: Oct. 9, 2009

(65) Prior Publication Data
US 2010/0108591 A1    May 6, 2010

Related U.S. Application Data

(62) Division of application No. 11/627,085, filed on Jan. 25, 2007, now Pat. No. 7,615,151.

(51) Int. Cl.
*B01D 35/30* (2006.01)
*B01D 35/02* (2006.01)
*B01D 35/00* (2006.01)
*B01D 35/28* (2006.01)

(52) U.S. Cl. ............. 210/235; 210/100; 210/148; 210/232; 210/429; 210/430; 210/435

(58) Field of Classification Search ......... 210/100, 210/148, 429, 430, 431, 235
See application file for complete search history.

(56) References Cited

U.S. PATENT DOCUMENTS

| | | | |
|---|---|---|---|
| 2,569,316 A | 9/1951 | Jerman | |
| 2,608,376 A | 8/1952 | Adams | |
| 2,609,835 A | 9/1952 | Horvay | |
| 2,646,071 A | 7/1953 | Wagner | |
| 2,667,895 A | 2/1954 | Pool et al. | |
| 2,949,931 A | 8/1960 | Ruppright | |
| 3,026,903 A | 3/1962 | Roach | |
| 3,217,736 A | 11/1965 | Voss | |
| 3,495,620 A | 2/1970 | Raimondi et al. | |
| 3,529,727 A | 9/1970 | Bernhard | |
| 4,498,495 A | 2/1985 | Worwood et al. | |
| 4,772,386 A | 9/1988 | Grout et al. | |
| 4,792,113 A | 12/1988 | Eidsmore | |
| 4,874,012 A | 10/1989 | Velie | |

(Continued)

FOREIGN PATENT DOCUMENTS

WO    2005056942    6/2005

*Primary Examiner*—Krishnan S Menon
*Assistant Examiner*—Benjamin Kurtz
(74) *Attorney, Agent, or Firm*—Andrus, Sceales, Starke & Sawall, LLP; J. Bruce Schelkopf

(57) ABSTRACT

A filter with installation integrity permits fluid flow only in a first installation condition and not in a second undesired or mis-installation condition, including improper alignment or mounting of a filter element in a housing, an incorrect replacement filter element, absence of a filter element, and an incorrect housing cover. A magnetically actuated valve has a piston controlling fluid flow according to installation condition.

14 Claims, 15 Drawing Sheets

U.S. PATENT DOCUMENTS

| | | |
|---|---|---|
| 5,320,136 A | 6/1994 | Morris et al. |
| 5,695,637 A | 12/1997 | Jiang et al. |
| 5,855,780 A | 1/1999 | Dye et al. |
| 6,051,144 A | 4/2000 | Clack et al. |
| 6,319,402 B1 | 11/2001 | Schwandt et al. |
| 7,517,452 B2 | 4/2009 | Chapman et al. |
| 2003/0042192 A1 | 3/2003 | Nam et al. |
| 2004/0222395 A1 | 11/2004 | Yee |
| 2005/0279676 A1 | 12/2005 | Izzy et al. |

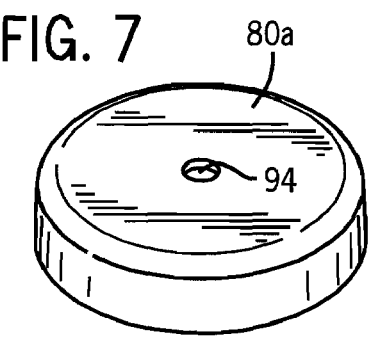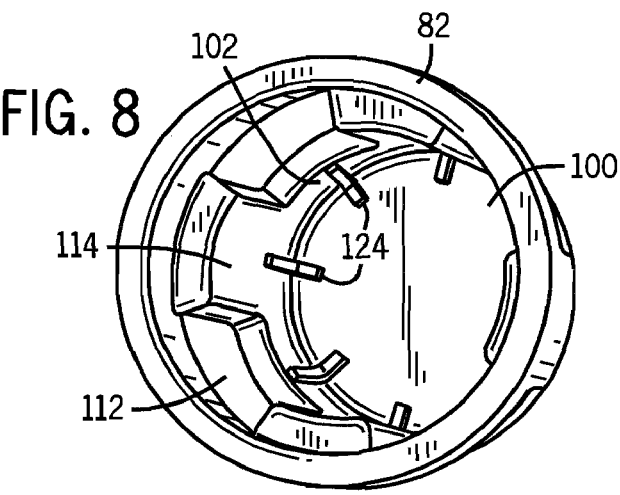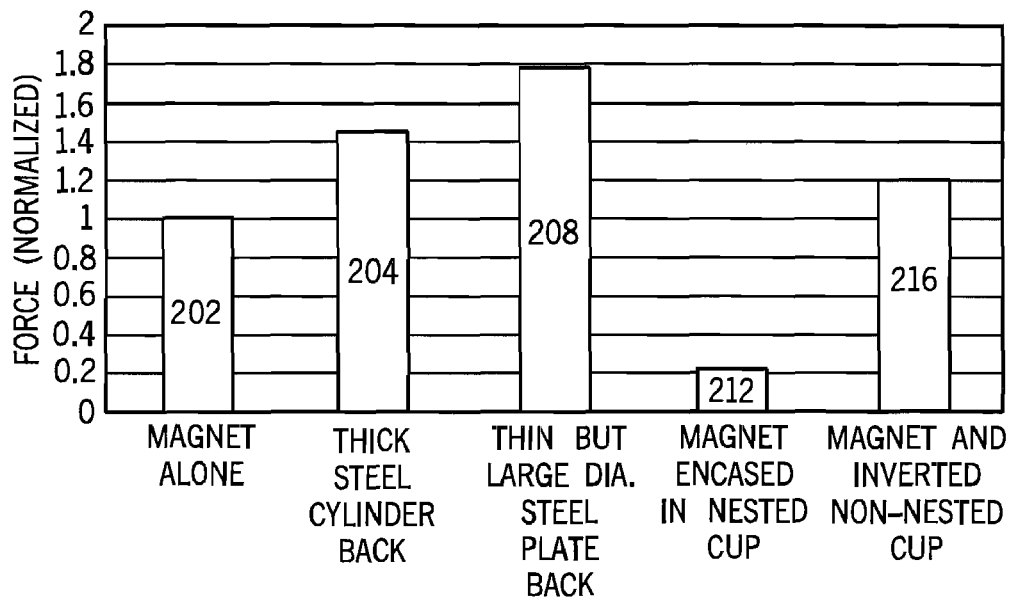

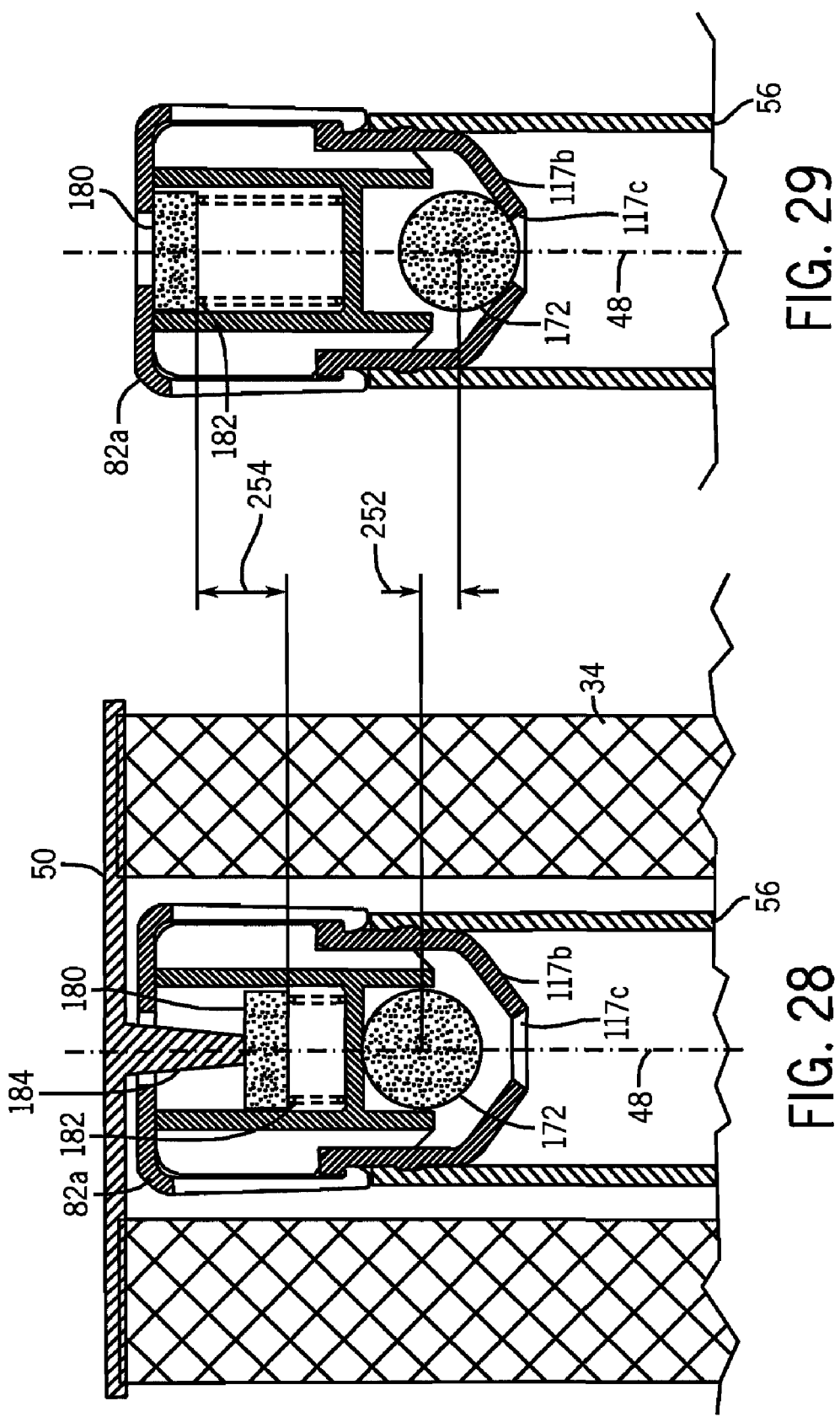

FILTER WITH INSTALLATION INTEGRITY AND MAGNETIC FLOW-CONTROL

CROSS REFERENCE TO RELATED APPLICATION

This application is a division of U.S. patent application Ser. No. 11/627,085, filed Jan. 25, 2007.

BACKGROUND AND SUMMARY

The invention relates to fluid filters, including systems assuring proper installation including use of correct components, including replacement components.

Fluid filters are known in the prior art. The filter filters fluid flowing to one or more components to provide clean filtered fluid therefor and protection of same. For example, fuel systems in diesel engines are susceptible to damage due to erosion and corrosion, among other things. Erosion can be caused by contaminant in the fuel reaching sensitive mechanical components such as fuel injectors and pumps. Corrosion can be caused by water contamination in the fuel system. A fuel/water separator is typically used to remove both particle contaminant and water. As fuel system injection pressures continue to increase, these degradation modes become more important. Engine and fuel system manufacturers are increasingly desirous of providing correct fuel filtration as a first fit on the engine, as well as for replacement filters used during routine service.

The present invention arose during continuing development efforts directed toward the above issues, though it has broader application beyond fuel systems. The present invention provides a filter with installation integrity flow-control providing fluid flow through the filter in a proper installation condition, and with mis-installation cut-off at least partially blocking fluid flow through the filter when in an improperly installed condition, for example an improperly mounted or aligned filter element or replacement filter element within a filter housing, an incorrect replacement filter, absence of a filter element, an incorrect housing cover, and so on. The fluid flow may be completely cut-off, or fluid flow may be choked or reduced, e.g. to provide only enough fuel to enable an engine to run in a degraded performance mode, e.g. for limp-home.

A filter with installation integrity cut-on is desirable for manufacturers, including OEMs (original equipment manufacturers), to ensure proper installation, including mounting, alignment, correct replacement filter elements meeting OEM specifications, etc., to protect various components and ensure the supply of clean filtered fluid thereto.

BRIEF DESCRIPTION OF THE DRAWINGS

FIG. 7 is a perspective view of an alternate embodiment of a component of FIG. 5.

FIG. 8 is a perspective view from below of a component of FIG. 5.

FIG. 17 is a plot of normalized magnetic force vs. the type of backer member in FIG. 6.
FIG. 28 is like FIGS. 3 and 16 and shows another embodiment.
FIG. 29 is like FIG. 28 and shows a different operational condition.

DETAILED DESCRIPTION

Figure 1:
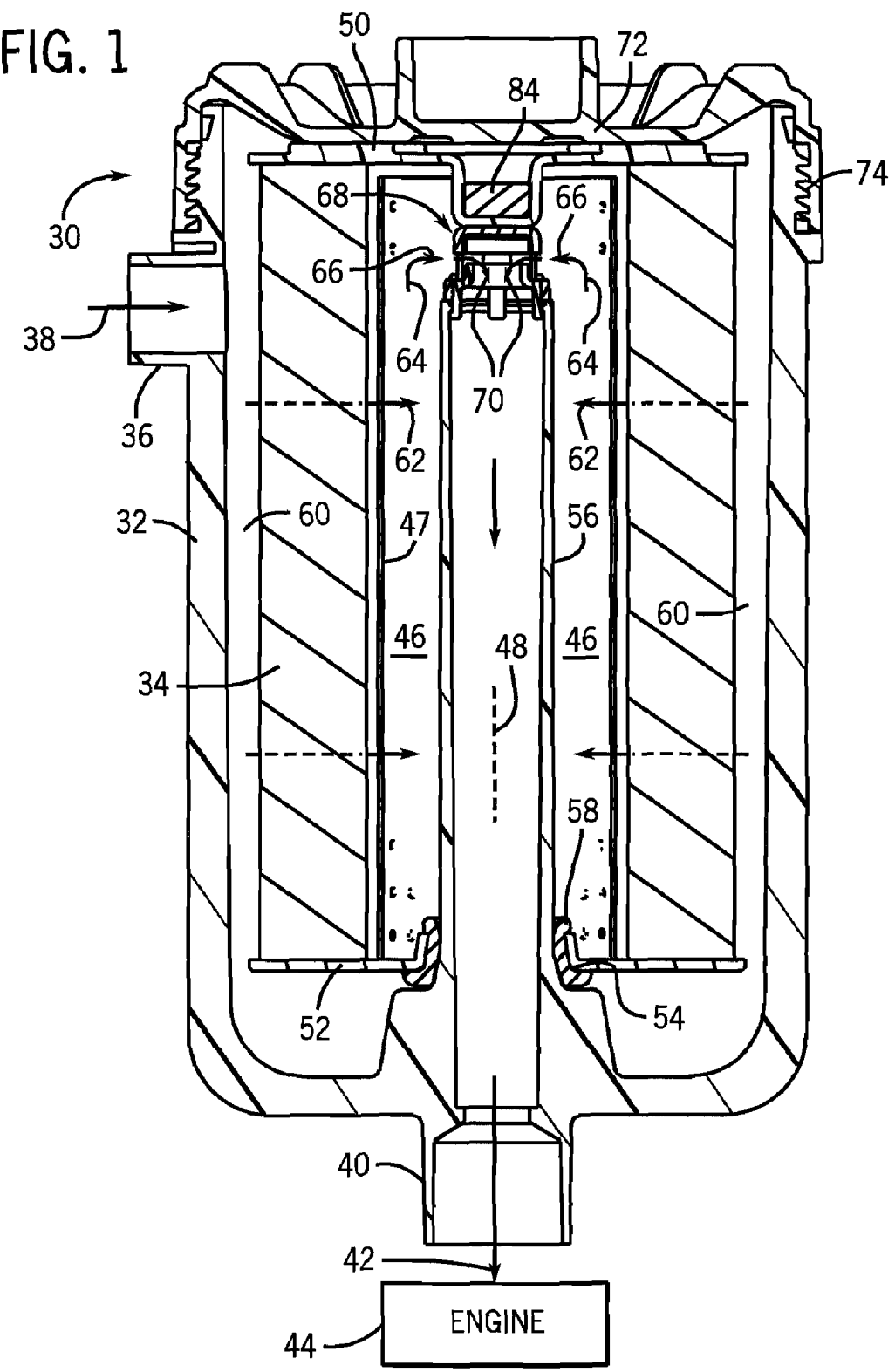
FIG. 1 is a sectional view of a filter with installation integrity cut-on in accordance with an embodiment of the invention.

FIG. 1 shows a filter 30 with installation integrity and magnetic flow-control in accordance with a preferred embodiment of the invention. The filter includes a housing 32 containing a filter element 34. The housing has an inlet 36 for receiving dirty fluid as shown at arrow 38, and has an outlet 40 for discharging clean filtered fluid as shown at arrow 42, to a designated component, e.g. an internal combustion engine 44, etc. In one embodiment, filter element 34 is an annular member having a hollow interior 46 and may have an inner perforated liner or sleeve 47. The filter element extends axially along axis 48 between upper and lower end caps 50 and 52. Upper end cap 50 laterally spans across and closes hollow interior 46. Lower end cap 52 has an opening 54 through which a duct or standpipe 56 extends axially upwardly and is sealed thereto at gasket 58. The housing defines a fluid flow path through the filter element between inlet 36 and outlet 40. The fluid flows through inlet 36 as shown at arrow 38 into outer annular dirty fluid chamber 60, then laterally inwardly through filter element 34 and liner 47 as shown at arrows 62, then into hollow interior 46 as clean filtered fluid, then upwardly as shown at arrows 64 and laterally as shown at arrows 66, then through valve structure 68, to be described, then into duct or standpipe 56 as shown at arrows 70, then downwardly to outlet 40 for discharge as clean filtered fluid as shown at arrow 42. Housing 32 is closed by a removable cover 72, for example engaging the housing in threaded relation as shown at 74, or in various other manners such as a quarter turn lock, latches, fasteners, etc. Cover 72 typically engages upper end cap 50 of the filter element and secures the latter in place. In alternative embodiments, cover 72 does not engage and/or is not mounted to upper end cap 50, and such upper end cap may have a handle for extraction of the filter element.

Figure 2:
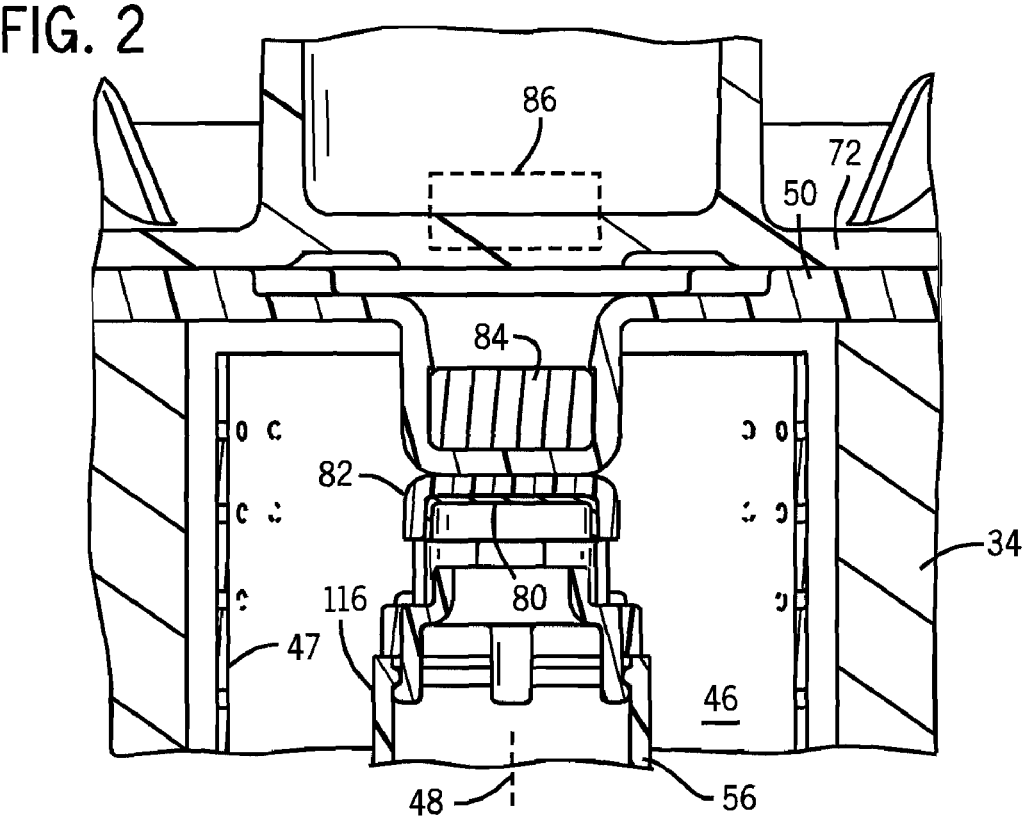
FIG. 2 is an enlarged view of a portion of FIG. 1.
Figure 4:
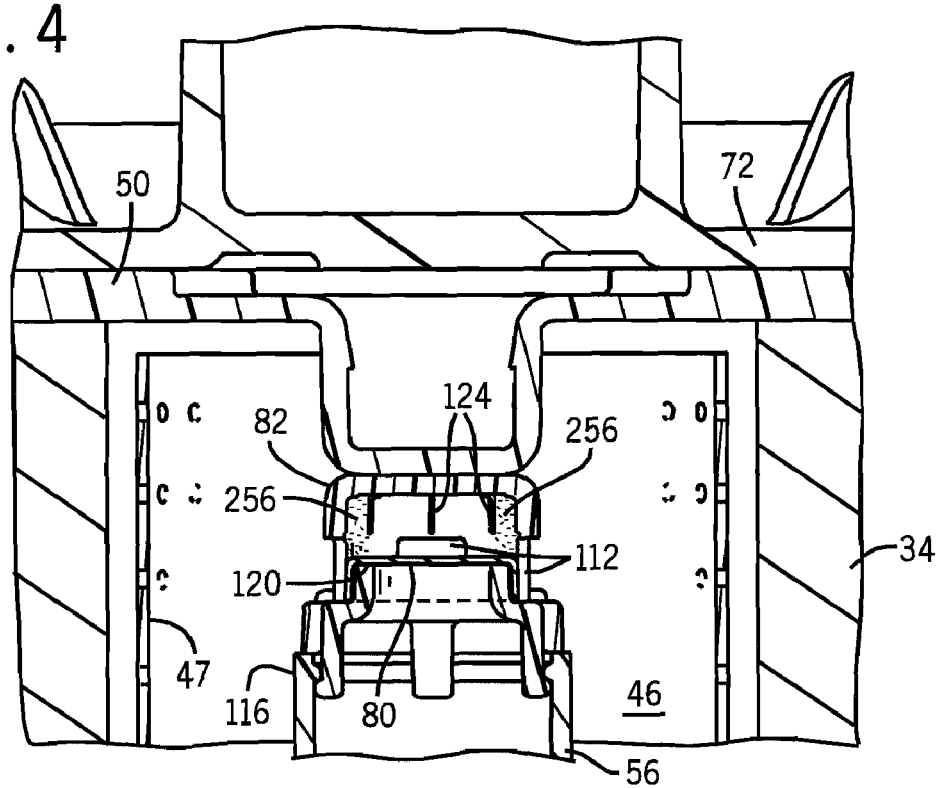
FIG. 4 is like FIG. 2 and shows a different operational condition.
Figure 3:
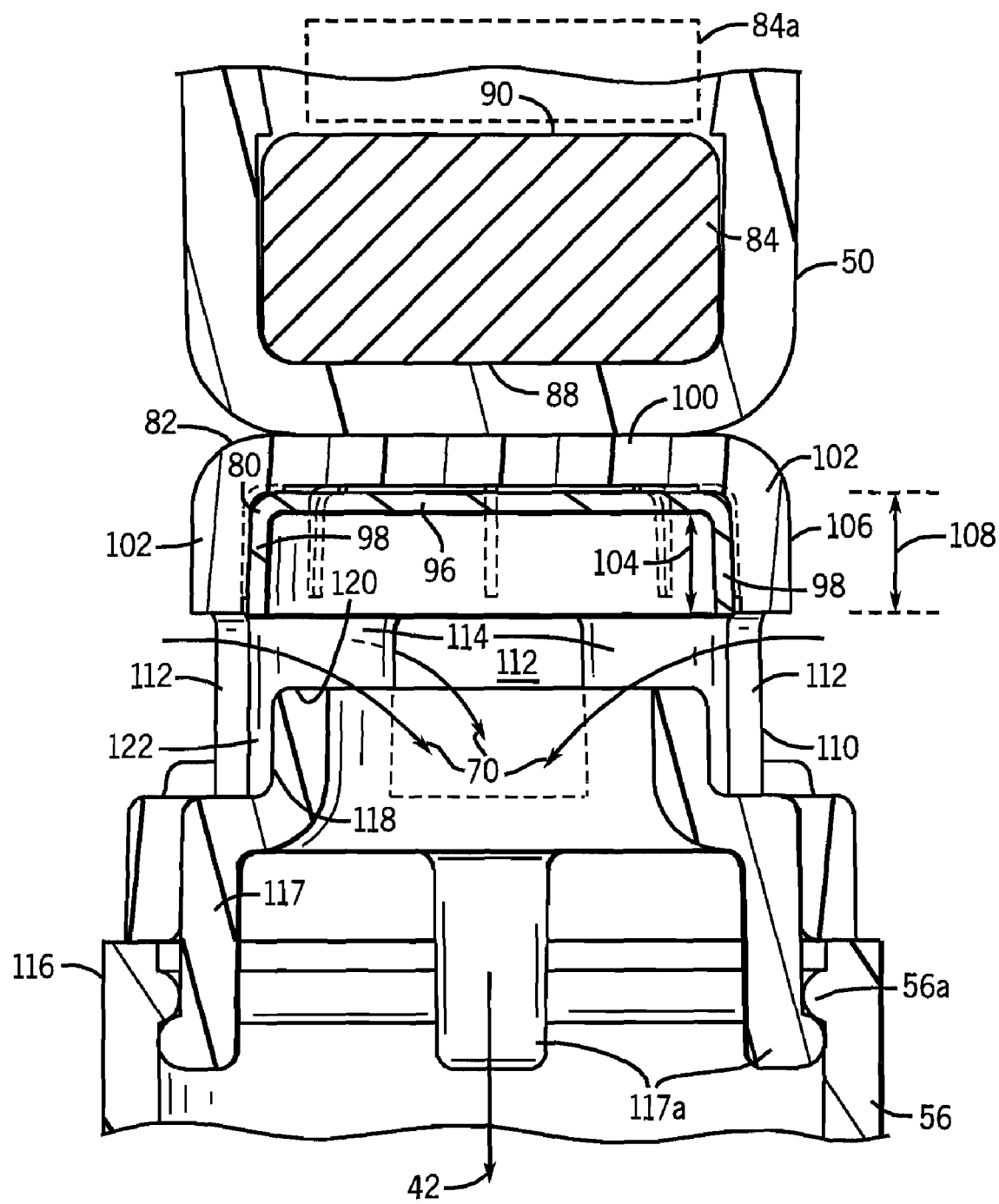
FIG. 3 is an enlarged view of a portion of FIG. 2.
Figure 5:
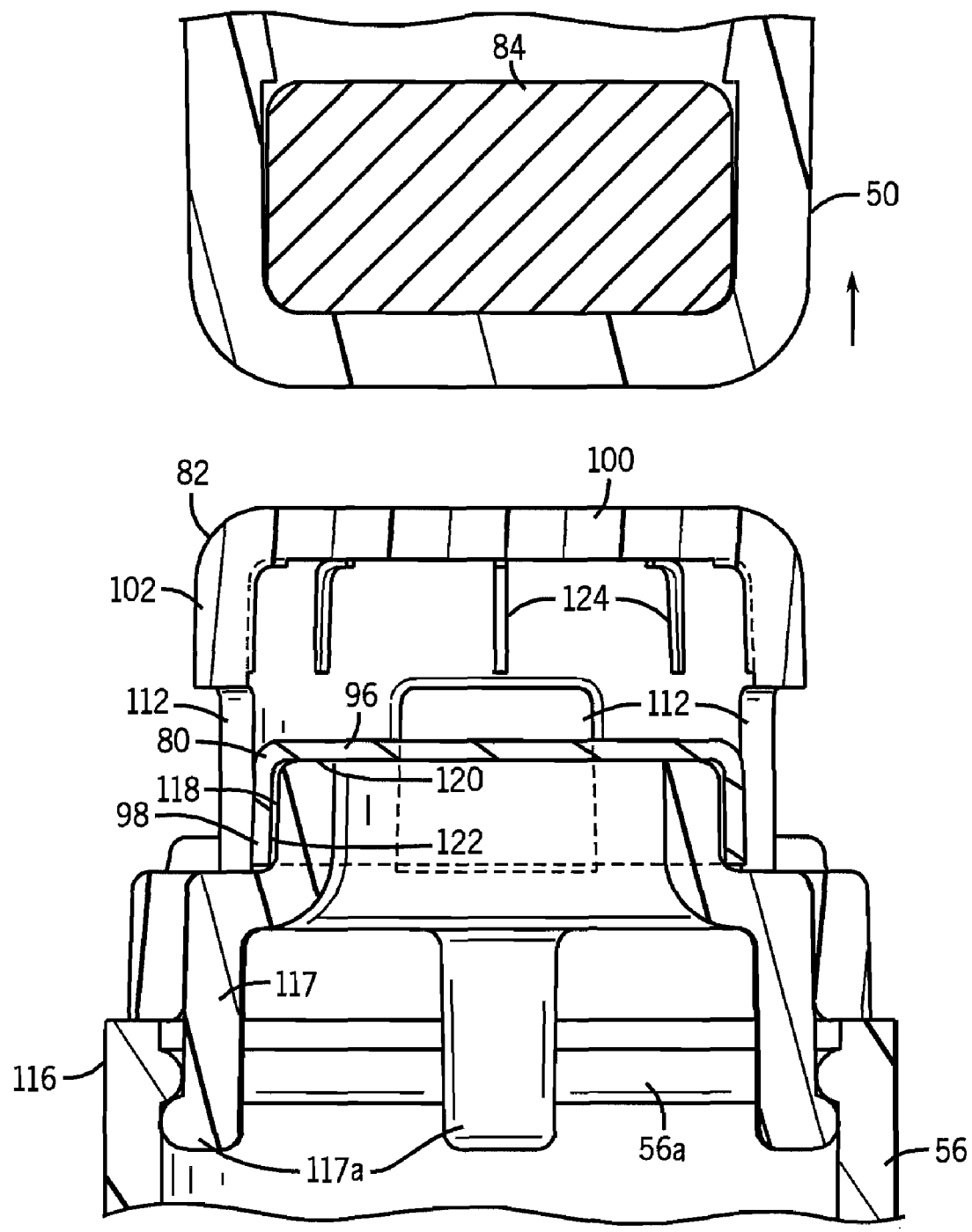
FIG. 5 is an enlarged view of a portion of FIG. 4.

The filter has a first installation condition, FIGS. 2, 3, providing desired filter integrity, and enabling the noted fluid flow path. The filter has a second installation condition, FIGS. 4, 5, corresponding to a less than desired installation condition or a mis-installation. The noted fluid flow path through the filter includes the noted duct or standpipe 56 having the noted valve structure 68 including a magnetically biased piston 80 movable between a first upward position, FIGS. 2, 3, permitting fluid flow through the duct as shown at arrows 70, FIG. 3, thus permitting fluid flow between the filter inlet and outlet, and a second position, FIGS. 4, 5, at least partially blocking fluid flow through duct or standpipe 56 between the filter inlet and outlet. Piston 80 is in the noted first position of FIGS. 2, 3 when the filter is in the noted first installation condition. Piston 80 is in the noted second position of FIGS. 4, 5, when the filter is in the noted second installation condition. In one embodiment, the noted second position of the piston, FIGS. 4, 5, is a closed condition, blocking fluid flow from reaching outlet 40. In another embodiment, to be described, the piston in the noted second position only partially blocks fluid flow through duct or standpipe 56, to provide a reduced fluid flow rate, for example providing degraded performance of an engine such as 44 for limp-home even in the noted mis-installation condition of the filter.

Standpipe 56, FIG. 3, includes a cage 82 extending upwardly therefrom and supporting and guiding piston 80 for movement between the noted first and second positions, upwardly and downwardly in FIGS. 2-5. One of the housing, filter element, and cage has a magnetic actuation section 84 proximate to and magnetically coupled to piston 80 when the filter is in the noted first installation condition, FIGS. 2, 3, with magnetic coupling providing sufficient magnetic force to attract and move piston 80 upwardly to the noted first position, FIGS. 2, 3. This magnetic coupling is missing in the noted second installation condition, FIGS. 4, 5, whereby there is insufficient magnetic force, e.g. no magnetic force, to attract and move piston 80 upwardly to the noted first position. Such second or mis-installation condition may occur when there is improper alignment or mounting of filter element 34 in housing 32, or when an incorrect replacement filter element is used, or in the absence of such filter element, or an incorrect cover is used, etc., to be further described.

Figure 6:
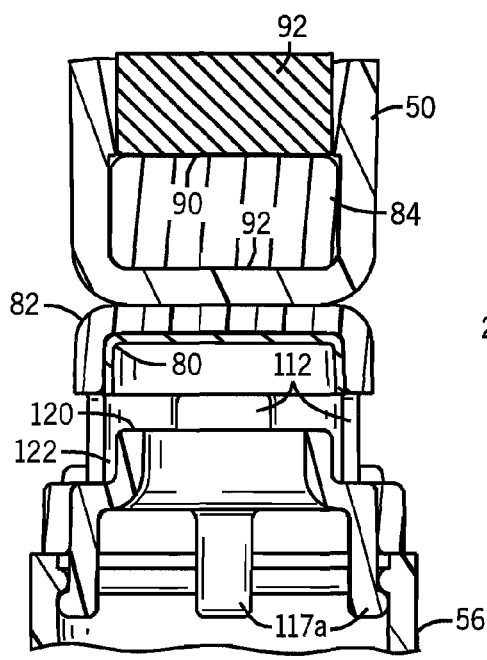
FIG. 6 is like FIG. 5 and shows another embodiment.

In one embodiment, the noted magnetic actuation section is a magnet 84, and piston 80 is provided by magnetically permeable material, preferably ferromagnetic material. In one embodiment, magnet 84 is mounted to filter end cap 50, as shown in FIGS. 2, 3. In another embodiment, a magnet 86, shown in dashed line in FIG. 2, is mounted to removable cover 72 which closes housing 32, to be further described, in addition to or in place of magnet 84. Magnet 84 and/or magnet 86 has a first side 88 and has an oppositely facing second side 90. In another embodiment, a magnetically permeable, preferably ferromagnetic, backer member 92, FIG. 6, is provided on second side 90 and amplifies and focuses the magnetic gradient towards piston 80, to be described. Member 92 may be a magnet or may be composed of magnetically permeable material. In a further embodiment, the piston may be a magnet, and magnetic actuation section 84 and/or 86 may be magnetically permeable material, whether a magnet or not.

In one embodiment which may be useful in fuel systems for internal combustion engine applications, filter 30 is a fuel filter, and piston 80 in the noted second position of FIGS. 4, 5 permits limited fuel flow through standpipe 56 to engine 44 to permit limp-home and degraded operational performance of the latter. In such application, a piston such as 80a in FIG. 7 may have an orifice 94 therethrough providing limited fuel flow in the second position of the piston, FIGS. 4, 5, to provide limp-home.

In the embodiment of FIGS. 2-5, piston 80 and cage 82 are cup-shaped members engaging each other in nested relation. Piston 80 moves along an axial direction along axis 48 between the noted first and second positions, FIGS. 2 and 4, respectively. Piston 80 is an inverted inner cup-shaped member, and cage 82 is an inverted outer cup-shaped member. The piston inner cup-shaped member has a laterally spanning disk portion 96, and a sidewall or skirt 98 extending axially downwardly therefrom. The cage outer cup-shaped member has a laterally spanning disk portion 100, and a sidewall or skirt 102 extending axially downwardly therefrom. Sidewall 98 of the piston is axially slidable along and guided by sidewall 102 of the cage. Disk portion 96 of the piston is adjacent disk portion 100 of the cage when the piston is in the noted first position, FIGS. 2, 3. Disk portion 96 of the piston is spaced from disk portion 100 of the cage when piston 80 is in the noted second downward position of FIGS. 4, 5. Sidewall 98 of piston 80 has a first axial height 104, FIG. 3, extending from disk portion 96. Sidewall 102 of cage 82 has a first section 106 of a second axial height 108 extending axially from disk portion 100 of the cage. Sidewall 102 of the cage has a second section 110 extending axially from first section 106. Second section 110 of sidewall 102 of cage 82 has one or more apertures 112 passing fluid flow therethrough as shown at arrows 70 from hollow interior 46 into the top of standpipe duct 56. Sidewall 102 of cage 82 has a plurality of axially extending columns such as 114 laterally between respective apertures and providing a guide track for guiding axial movement of piston 80 therealong. The noted first axial height 104 is less than or equal to the noted second axial height 108 such that when piston 80 is in the noted upper first position of FIGS. 2, 3, sidewall 98 of the piston is out of the fluid flow path 66, 70 through apertures 112 in sidewall 102 of cage 82, to minimize turbulence, including turbulence which may otherwise dislodge piston 80 from its upward first position. The cup shape of piston 80 is desired because the sidewall or skirt 98 of the piston helps guide axial travel of the piston, without sideways tilting and binding though other piston shapes may be used.

Standpipe 56 extends axially along axis 48 in hollow interior 46 of filter element 34 and has an end 116, FIG. 2, terminating in hollow interior 46. Cage 82 and piston 80 are at end 116 of the standpipe. Piston 80 moves axially between the noted first upper position of FIG. 2 and the noted second lower position of FIG. 4 as guided by cage 82. Piston 80 is magnetically biased to the noted first upper position, and is gravitationally biased to the noted second lower position. A cage-holder and mounting member 117, FIGS. 3, 5, extends upwardly from upper end 116 of the standpipe and has a guide track surface 118 extending upwardly to a valve seat 120. Piston 80 is provided by the noted inverted cup-shaped member having disk portion 96 laterally spanning and engaging and closing valve seat 120 in the noted second lower position of the piston, FIGS. 4, 5. Sidewall or skirt 98 of the piston extends axially downwardly from disk portion 96 and circumscribes inner guide track 118 in the noted second lower position of the piston and is axially slidable along inner guide track 118 during axial movement of the piston. Cage 82 includes an outer guide track at axially extending columns 114 extending axially upwardly from end 116 of the standpipe and spaced laterally outwardly of inner guide track 118 by a lateral gap 122 therebetween forming an annulus. Sidewall 98 of piston 80 is in gap 122 when the piston is in its second lower position of FIGS. 4, 5. Sidewall 98 of piston 80 is guided along outer guide track 114 during axial movement of piston 80 between the noted first and second positions. In one embodiment, cage-holder and mounting member 117 is snap-fit at legs 117a downwardly into the interior of standpipe 56 past annular ridge or ring 56a of the standpipe. In other embodiments, member 117 is secured to standpipe 56 by a press-fit, sonic welding, adhesive, etc. Cage 82 is then mounted to member 117, e.g. by adhesive, sonic welding, press-fit, etc.

In one embodiment, one of the noted cup-shaped members 80 and 82 has one or more bosses, e.g. ribs, protruding therefrom to engage the other cup-shaped member in the noted first upper position of piston 80 and prevent the piston from sticking to cage 82 in the noted first upper position of the piston, to ensure return of piston 80 to its second lower position responsive to gravitational bias in the absence of magnetic bias. For example, FIG. 8 shows bosses provided by ribs 124 protruding slightly from the undersurface of disk portion 100 of cage 82 and also protruding slightly from the interior surface of sidewall 102 of cage 82.

Figure 9:
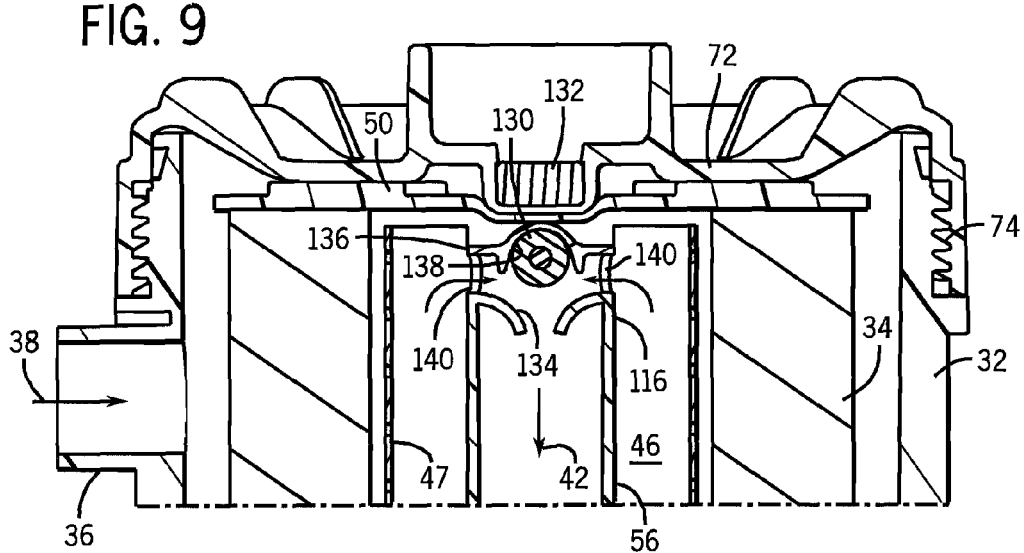
FIG. 9 is like FIG. 2 and shows another embodiment.

FIG. 9 shows a further embodiment and uses like reference numerals from above where appropriate to facilitate understanding. The piston of FIGS. 1-7 is provided in FIG. 9 by a sphere 130, e.g. a ball, axially movable between a first upper position as magnetically biased and attracted by magnet 132 in cover 72, and a second lower position seated against valve seat 134 at the end 116 of standpipe 56. Cage 136 at the end of the standpipe has an upper seat 138 against which ball 130 is attracted and seated in its noted first upper position, which in turn permits fluid flow through apertures 140 of the cage, which fluid then flows downwardly through open valve seat 134 into the interior of standpipe 56. In the absence of magnetic bias, ball 130 moves axially downwardly due to gravitational bias, to close valve seat 134 and block fluid flow into standpipe 56.

Figure 10:
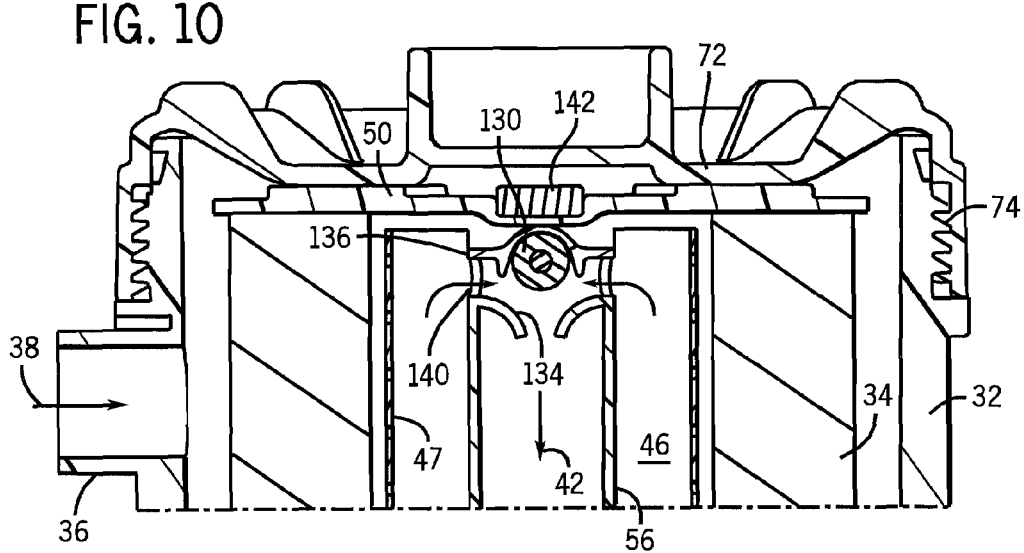
FIG. 10 is like FIG. 2 and shows another embodiment.

FIG. 10 shows a further embodiment and uses like reference numerals from above where appropriate to facilitate understanding. In addition to or in place of magnet 132 secured to cover 72, a magnet 142 is secured to filter element end cap 50.

Figure 11:
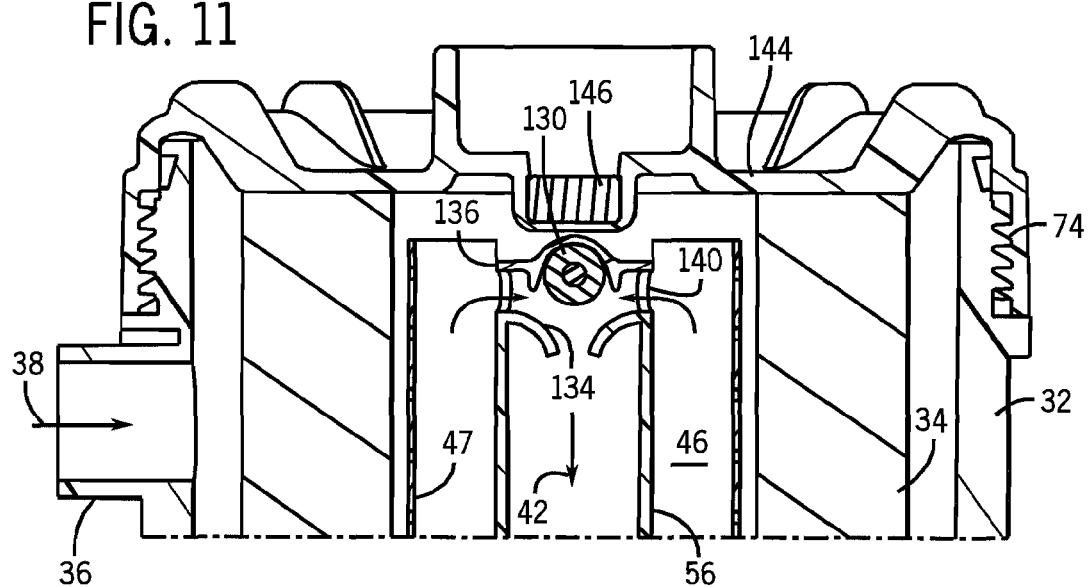
FIG. 11 is like FIG. 2 and shows another embodiment.

FIG. 11 shows a further embodiment and uses like reference numerals from above where appropriate to facilitate understanding. End cap 50 and cover 72 are replaced by a combined end cap and cover 144 providing in combination both of the noted functions of members 50 and 72. Magnet 146 is secured to combined cover and end cap 144.

Figure 12:
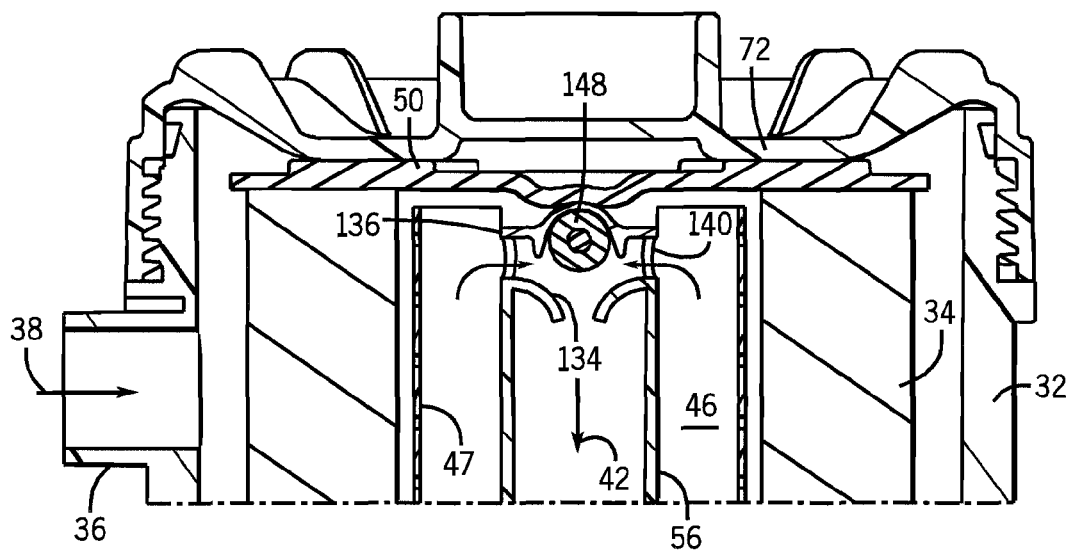
FIG. 12 is like FIG. 2 and shows another embodiment.

FIG. 12 shows a further embodiment and uses like reference numerals from above where appropriate to facilitate understanding. A magnetic ball 148 is used for the piston. End cap 50 and/or cover 72 include magnetically permeable material, preferably ferromagnetic material, which may include another magnet if desired for added magnetic attraction force.

Figure 13:
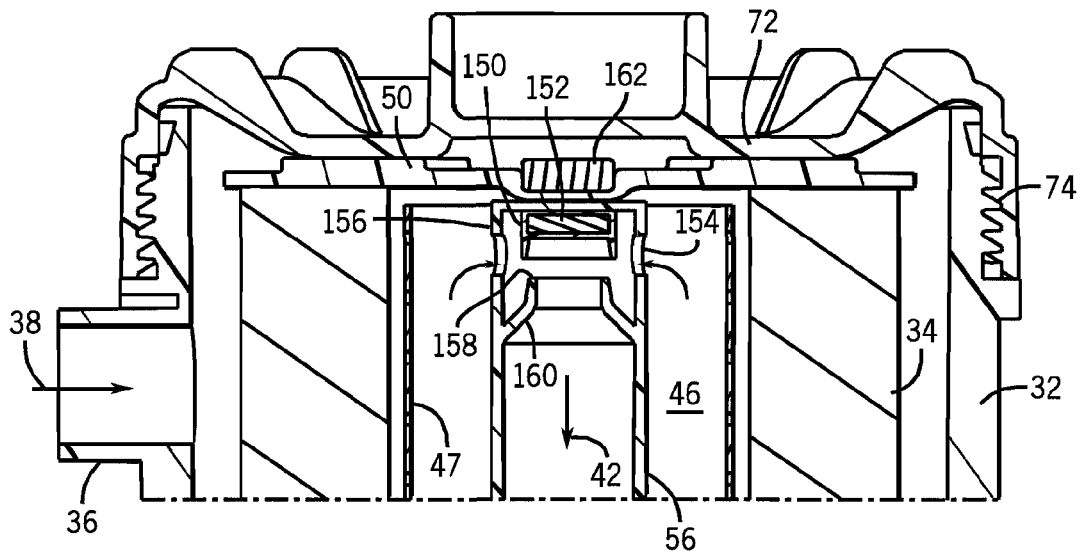
FIG. 13 is like FIG. 2 and shows another embodiment.

FIG. 13 shows a further embodiment and uses like reference numerals from above where appropriate to facilitate understanding. The piston is provided by a valve disk 150 having a magnet 152 secured thereto and axially movable between upper and lower positions. In the upper position of valve disk 150, fluid flows through apertures 154 of cage 156. In the second lower position, valve disk 150 engages and closes valve seat 158 of inner cage portion 160. End cap 50 and/or cover 72 includes magnetic actuation section 162 provided by magnetically permeable material, preferably ferromagnetic material, which may include another magnet if desired.

Figure 14:
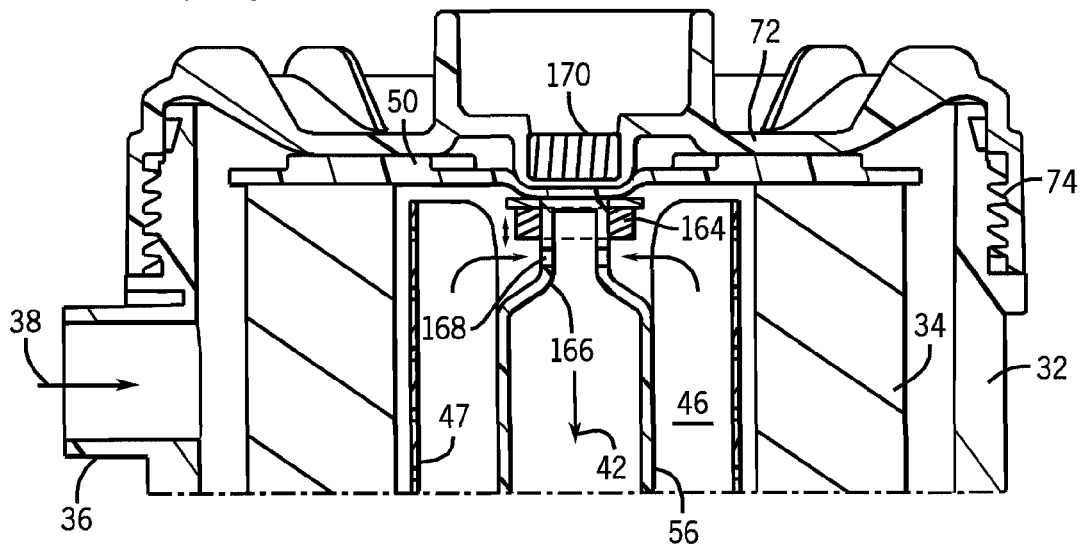
FIG. 14 is like FIG. 2 and shows another embodiment.

FIG. 14 shows a further embodiment and uses like reference numerals from above where appropriate to facilitate understanding. The axially movable piston is provided by an annular ring magnet 164 slidable along inner cage guide portion 166 at the top of standpipe 56 between a first upper position exposing apertures 168 to permit fluid flow therethrough into the standpipe, and a second lower position covering and blocking apertures 168. End plate 50 and/or cover 72 includes a magnetic actuation section 170 provided by magnetically permeable material, preferably ferromagnetic material, which may include one or more additional magnets if desired.

Figure 15:
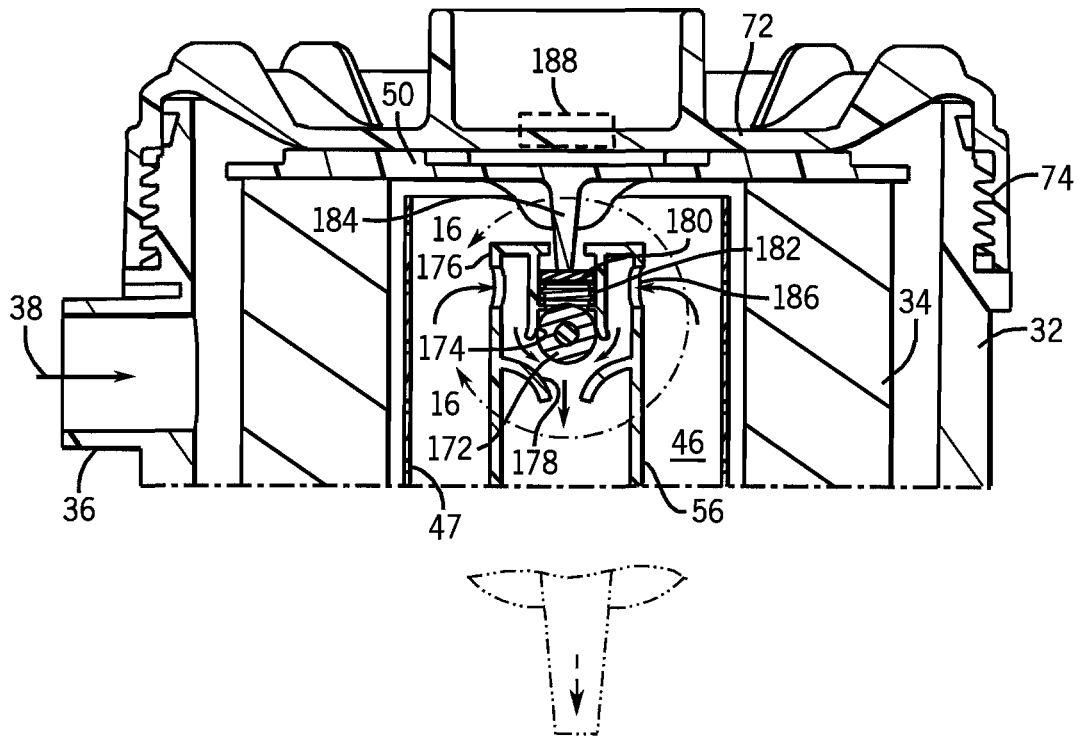
FIG. 15 is like FIG. 2 and shows another embodiment.
Figure 16:
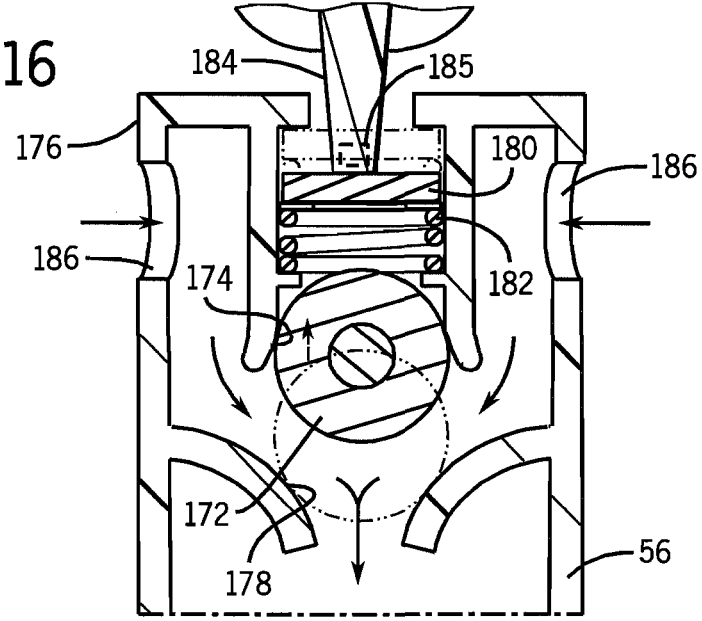
FIG. 16 is an enlarged view of a portion of FIG. 15.
Figure 18:
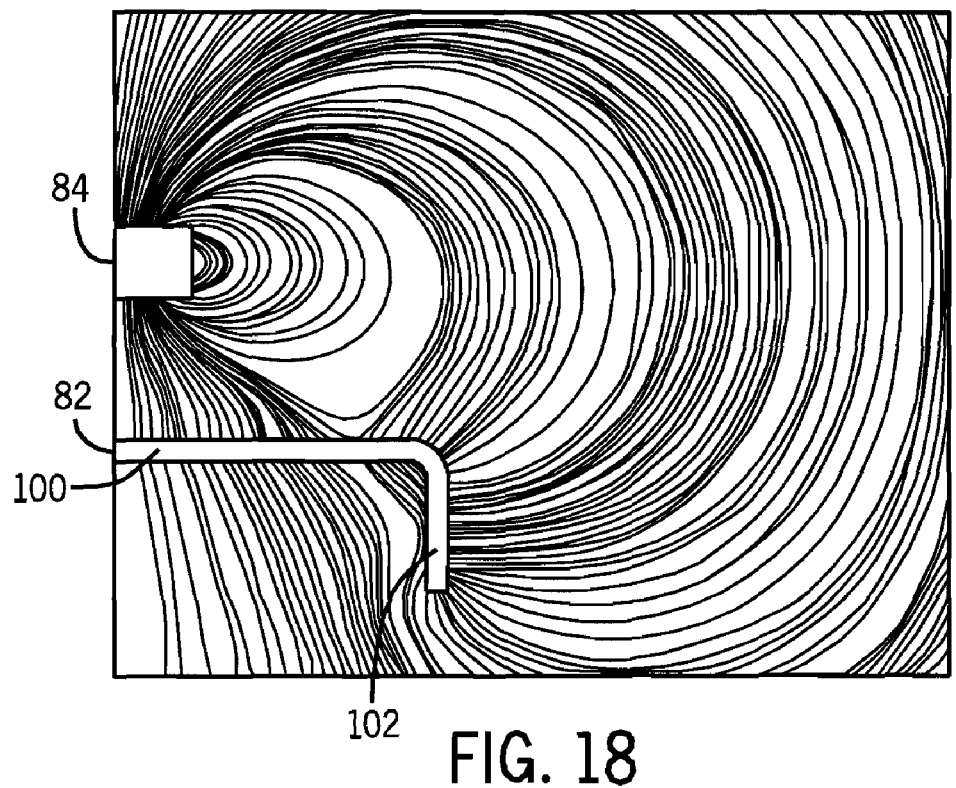
FIG. 18 is a magnetic flux plot for an embodiment of FIG. 6.
Figure 19:
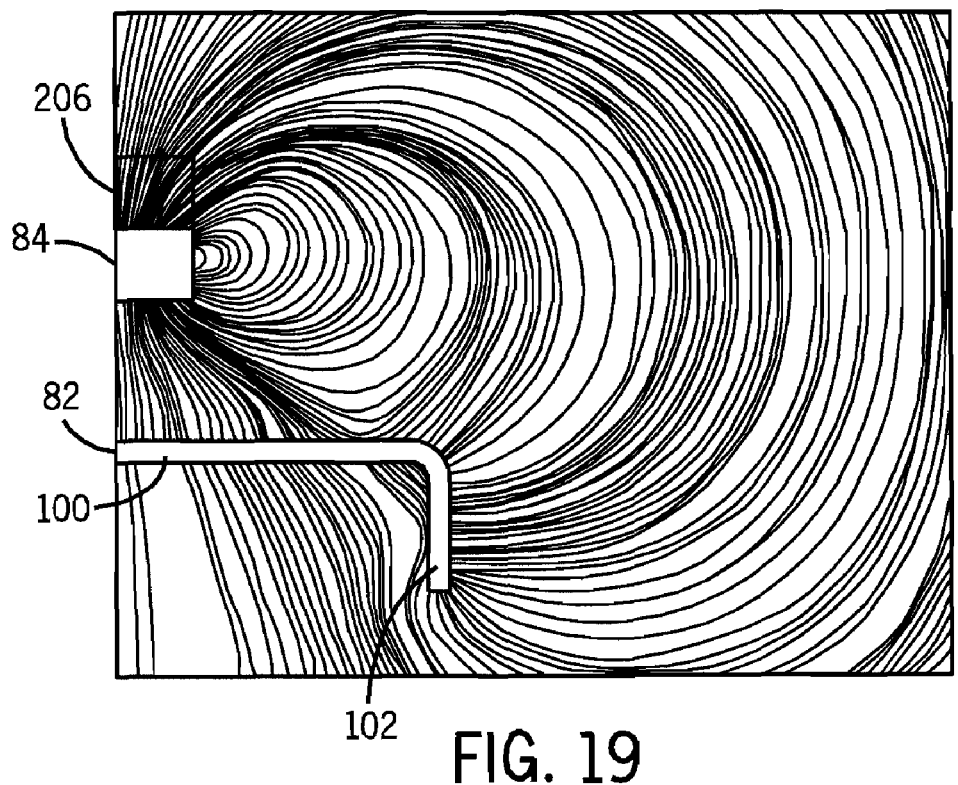
FIG. 19 is a magnetic flux plot for another embodiment of FIG. 6.
Figure 20:
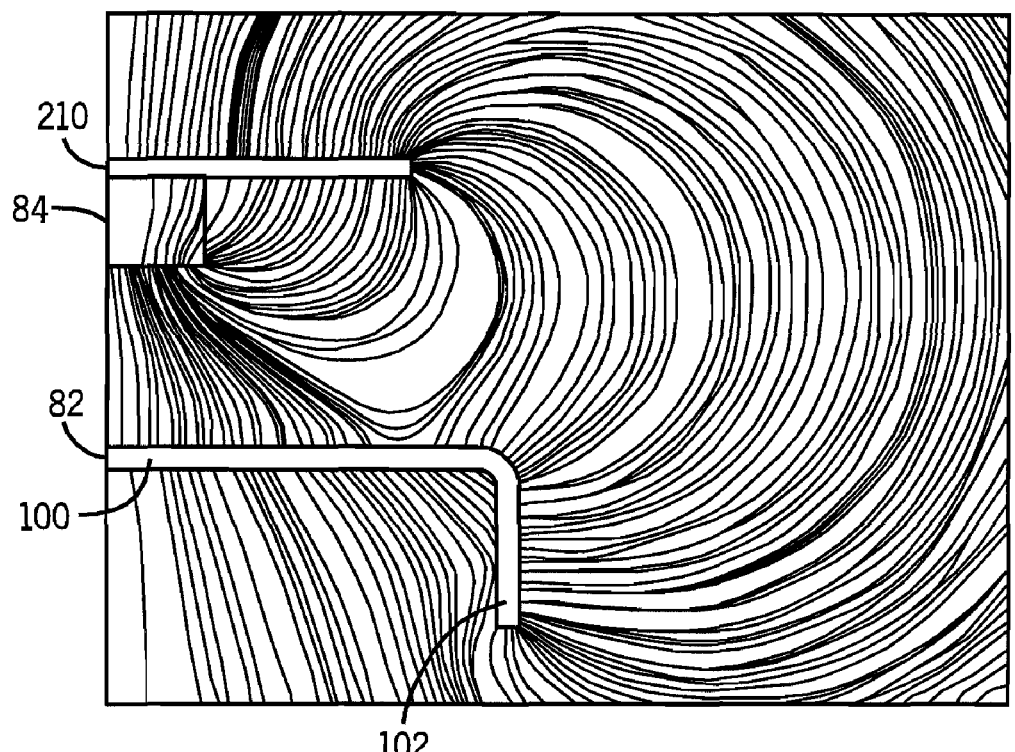
FIG. 20 is a magnetic flux plot for another embodiment of FIG. 6.
Figure 21:
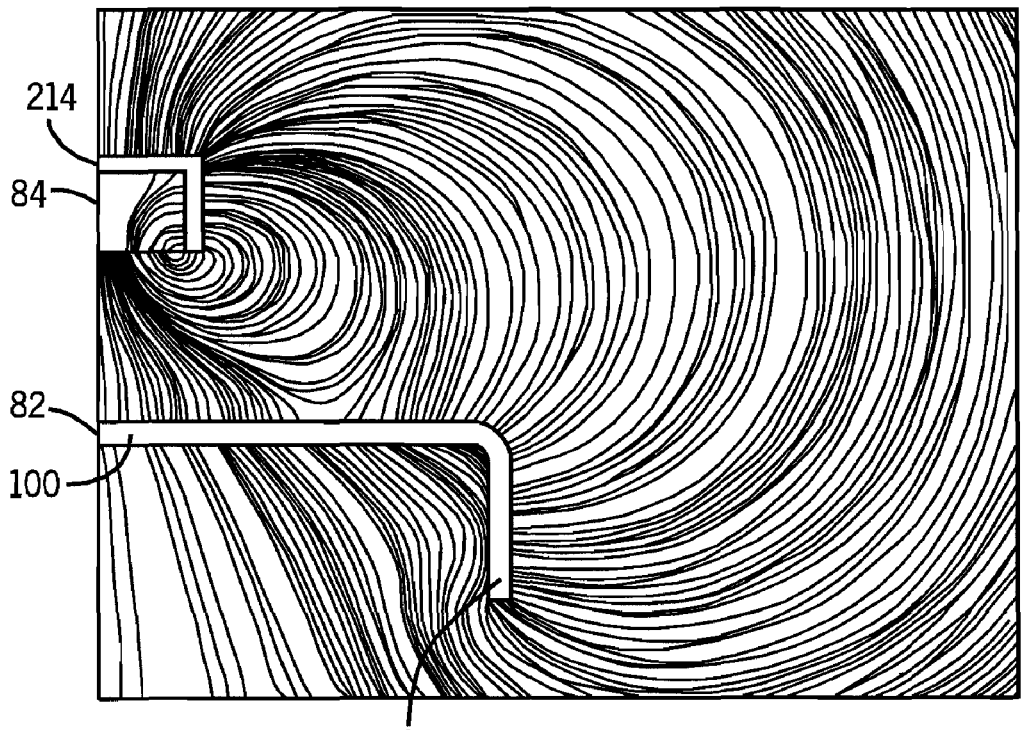
FIG. 21 is a magnetic flux plot for another embodiment of FIG. 6.
Figure 22:
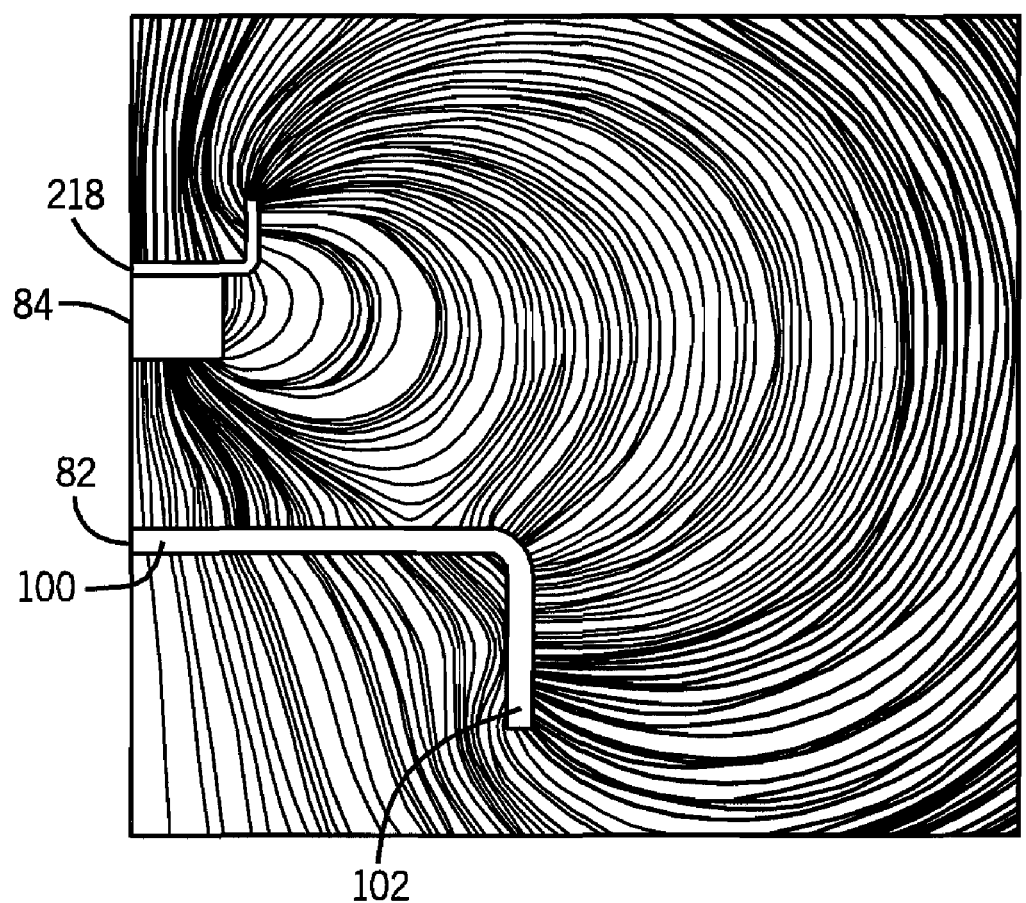
FIG. 22 is a magnetic flux plot for another embodiment of FIG. 6.

FIGS. 15, 16 show a further embodiment and use like reference numerals from above where appropriate to facilitate understanding. Magnetically permeable ball or piston 172, preferably ferromagnetic, and which may be a magnet, is axially movable between a first upper position against seat 174 of cage 176, and a second lower position closing valve seat 178. A magnet 180 at the upper portion of the cage is biased upwardly by spring 182 away from ball 172. Upon proper installation, a post 184 on end cap 50 or cover 72 engages and pushes magnet 180 downwardly to be in closer proximity to and magnetically attract ball 172 to its upper position against seat 174, such that fluid flows through apertures 186 in the cage and then through open valve seat 178 into standpipe 56. In the absence of post 184 pushing magnet 180 downwardly, the magnet 180 is in its upper position as biased by spring 182, and is spaced away from ball 172 such that there is insufficient magnetic force coupling to ball 172 to raise the latter against gravity, whereby ball 172 remains in its second lower position, closing valve seat 178. In a further embodiment, post 184 is eliminated, and instead a repelling magnet 188, shown in dashed line in FIG. 15, is secured to end cap 50 and/or cover 72, which repelling magnet magnetically repels magnet 180 downwardly to accomplish the noted function. In these embodiments, magnet 180 is movably mounted to the cage, and in the noted first installation condition is moved to an actuated position proximate to and magnetically coupled to piston or ball 172, such movement being mechanically provided by engagement from post 184 or magnetically provided by repulsion from magnet 188. Resilient biasing member 182 biases magnet 180 away from the noted actuated position. In a further alternative, a repulsion magnet is provided at the lower end of post 184, for example as shown in dashed line at 185, to repel magnet 180 axially downwardly.

In a further embodiment, an emergency service kit is provided by an auxiliary magnetic actuation member, e.g. 84a, FIG. 3, positionable to effect magnetic coupling to piston 80 independently of the noted installation conditions, to cause movement of piston 80 to the noted first upward position even if the filter is in the noted second installation condition. For example, the emergency service kit may include an auxiliary magnet 84a for placement on top of the filter to provide the noted magnetic coupling.

In a further embodiment, the filter element is a replaceable filter element which is replaced by removing removable cover 72, then removing the spent filter element, and then inserting a new replacement filter element. The noted second installation condition wherein piston 80 is not moved to its first upper position, but rather remains in its lower second position, may be due to improper alignment of the replacement filter element relative to at least one of housing 32 and cover 72, or improper mounting of the replacement filter element in the housing, or an incorrect replacement filter element (e.g. not meeting OEM specifications), or the absence of a filter element (e.g. where there is an attempt to use the system without a filter element 34), or an incorrect cover 72, etc. In a desirable aspect, a replacement filter element 34 is provided for a filter having installation integrity, ensuring that a correct replacement filter element (e.g. meeting OEM specifications) is in fact used. A correct replacement filter element must actuate the piston to the noted first position to enable fluid flow; otherwise the piston remains in the noted second position either cutting-off fluid flow or limiting fluid flow to a reduced amount. The filter element is removable from the housing and replaceable with a replacement filter element, which replacement filter element has a first installed condition providing the noted desired filter integrity, and having a second installed condition, the piston being in the noted first position when the replacement filter is in the noted first installed condition, the piston being in the noted second position when the replacement filter element is in the noted second installed condition. In one embodiment, the noted second installed condition of the replacement filter element is selected from the group consisting of an improperly mounted replacement filter element in the housing; and an incorrect replacement filter element.

In fuel system applications for internal combustion engines, the present system helps prevent installation of an incorrect filter element. A magnetic valve is actuated through the interaction of a magnetic field and the valve assembly 68 in the standpipe of the filter housing. If an incorrect filter element is installed, or if the filter element is removed altogether, the magnetic valve chokes or eliminates fuel flow to the engine. Thus, the engine is starved of fuel, or receives only enough fuel to run in a degraded performance mode, for limp-home. In a proper installation, the noted magnetic interaction actuates the valve and moves the piston to the open position, allowing fuel to flow to the engine. An emergency service kit disables the cut-off feature. The kit may include a magnet fastened to the top of the cover 72 or end cap 50 so that the valve remains open, i.e. piston 80 is maintained in its upward open position, despite a mis-installation condition such as use of an incorrect replacement filter element. Such kit may also be desirable during servicing where it is desired to hold the valve open with piston 80 in its upward position, for diagnostic test purposes, etc. In other embodiments, the kit may include a clip that snaps over the standpipe to hold an auxiliary magnet in place to attract piston 80 to its upward position, to be described.

Magnet 84 is preferably a neodymium iron boron (NdFeB) rare earth magnet, chosen for its balance of cost, temperature resistance, size, and magnetic field strength. Other magnet choices are preferably samarium cobalt (SaCo), ceramic, ferrite, and an electromagnet (in conjunction with an electrical power source). The magnet is preferably chosen to withstand the operating temperatures expected for the particular filter application. For example, in the case of fuel systems for internal combustion engines, under-hood temperatures continue to increase year to year, including temperatures in the range of 150° C. In one implementation, a N42H grade neodymium iron boron magnet is suitable for an operating range up to about 120° C. An "S" grade would be desired for a 150° C. application. The preferred embodiment locates magnet 84 at the top of and within the filter housing 32, which area may be filled with fuel, e.g. diesel fuel, or a diesel fuel/air mixture. In the case of the latter, the magnet may not be cooled by the fuel, and may reach the full ambient engine under-hood temperature, e.g. 120° C. to 150° C. The proper grade magnet is preferably selected so that the magnet's field strength will not be decreased when exposed to the noted elevated temperatures. Another criteria in magnet selection is corrosion resistance. In one preferred embodiment, the magnet is located on the top of end cap 50 of filter element 34, and accordingly is submerged in diesel fuel, biodiesel fuel, etc., which typically contains some percentage of water and some fuel additives. The magnet should be corrosion resistant, and may preferably have a corrosion resistant coating, appropriate for such environment. The magnet and/or its coating should be compatible with the remainder of the fuel system, i.e. the coating should not adversely affect other materials in the fuel system. In one embodiment, the noted neodymium iron boron magnet is triple nickel coated.

The noted magnetically permeable, preferably ferromagnetic, backer disk 92, FIG. 6, which may include one or more additional auxiliary magnets, desirably increases the magnetic field gradient in the direction of the valve piston 80, by the addition of a ferrous or otherwise magnetically permeable object in close proximity to magnet 84. In some embodiments, this may allow the use of a less expensive magnet (e.g. smaller, different type, lower grade, etc.) to achieve the required magnetic pull force on valve piston 80. Backer disk 92 placed on magnet 84 amplifies the magnetic field gradient projected toward piston 80 and thus increases magnetic attractive pull force. Such backer disk may be iron or a steel alloy, which may also aid assembly by providing a member to press-fit magnet 84 into its pocket in the end cap or cover without breaking such magnet.

FIGS. 17-22 compare different types of backer members for use as backer member 92 in FIG. 6. FIG. 17 is a plot of normalized magnetic force vs. the type of backer members, showing: at bar plot 202 the force provided by magnet 84 alone, with no backer member, as shown in the flux plot in FIG. 18; at bar plot 204 the magnetic force with the use of a thick steel cylinder backer member 206 as shown in the flux plot of FIG. 19; at bar plot 208 the magnetic force for a thin but large diameter steel plate backer member 210 as shown in the flux plot of FIG. 20; at bar plot 212 the magnetic force for magnet 84 encased in a cup-shaped backer member 214 nesting therearound as shown in the flux plot in FIG. 21; and at bar plot 216 the magnetic force for magnet 84 used with a reversed cup-shaped backer member 218 in non-nested relation with magnet 84 as shown in the flux plot in FIG. 22.

In various embodiments, multiple magnets may be used, e.g. in stacked relation for enhanced magnetic field strength. In further embodiments, opposite polarity magnets may be used for opening and closing functions, as noted. Magnetic field shaping and focusing structure may be used if desired to focus and direct flux field lines as desired, for example as above shown. Magnetic shielding may also be used if it is desired to avoid magnetic interference, e.g. in an engine compartment, in close proximity to sensitive electronic components.

Figure 23:
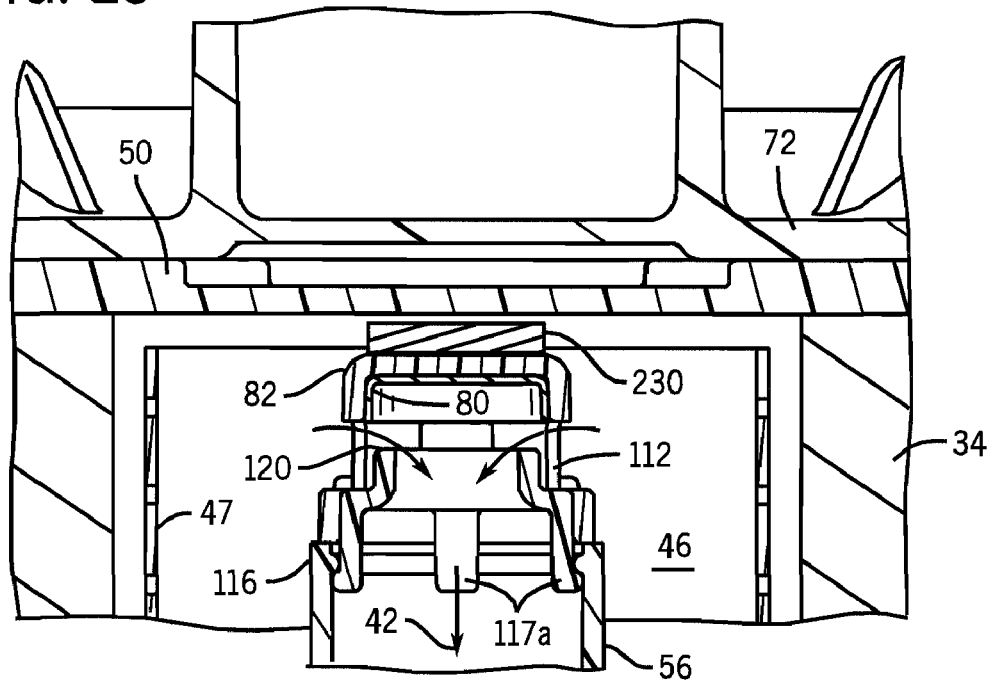
FIG. 23 is like FIG. 2 and shows another embodiment.

FIG. 23 shows a further embodiment and uses like reference numerals from above where appropriate to facilitate understanding. An emergency service kit is provided by auxiliary magnet 230 placed on top of cage 82 to maintain piston 80 in its upward open position. This may be desired where a replacement filter or an authorized replacement filter is not available, yet full fuel flow to the engine is needed. Magnet 230 may be held in place by its magnetic attraction to piston 80, or may be adhesively secured or otherwise mounted or bonded to the top of cage 82. The emergency service kit provides an auxiliary magnetic actuation member positionable to effect magnetic coupling to piston 80 independently of the noted installation conditions, to cause movement of piston 80 to the noted upward first position even if the filter is in the noted second installation condition.

Figure 24:
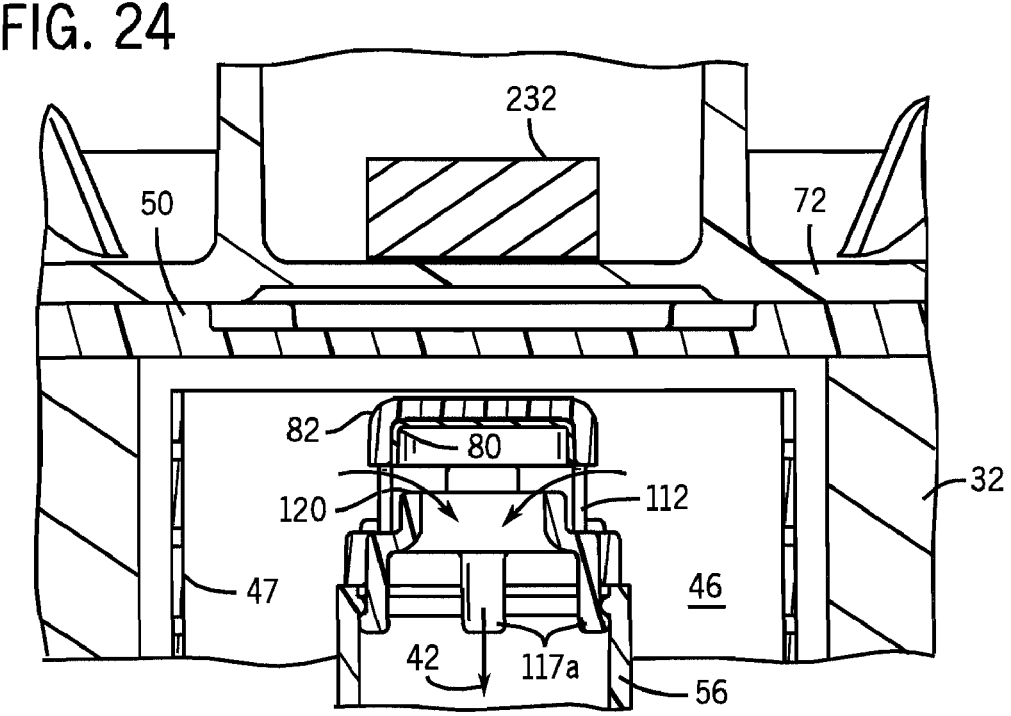
FIG. 24 is like FIG. 2 and shows another embodiment.

FIG. 24 shows a further embodiment and uses like reference numerals from above where appropriate to facilitate understanding. An emergency service kit is provided by auxiliary magnet 232 on top cover 72, for providing the above noted emergency service function. This is particularly easy for the operator driver to implement, by simply placing magnet 232 on the outer top surface of top cover 72, and securing magnet 232 thereto by adhesive, tape, or the like if needed.

Figure 25:
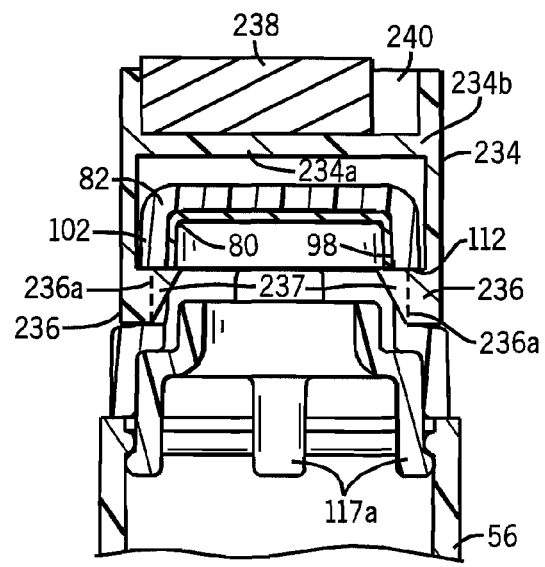
FIG. 25 is like FIG. 3 and shows another embodiment.

FIG. 25 shows a further embodiment and uses like reference numerals from above where appropriate to facilitate understanding. A clip-on auxiliary cap 234 includes lower barbed legs 236 snapping into apertures 112 of cage 82 to retain clip-on cap 234 thereon. The clip-on cap includes an auxiliary magnet 238 which attracts piston 80 upwardly to its open position, for the above noted emergency service function. A gap 240 is left adjacent magnet 238 to pry the magnet out of the cap with a screwdriver or the like, if it is desired to disable the emergency service function. In a further embodiment, the inner edges 237 of barbed legs 236 protrude laterally inwardly far enough into apertures 112 to extend below sidewall 98 of piston 80 and prevent downward movement of the piston after piston 80 is magnetically attracted upwardly to its open position by magnet 238. In such embodiment, magnet 238 may then be removed, and piston 80 will remain in its upward open position, to maintain the noted emergency service function. The removed magnet 238 may then be used with another clip-on auxiliary cap like 234 on another filter to provide the noted emergency service function therefor. If it is desired to not maintain the emergency service function in the absence of magnet 238, i.e. to disable the emergency service function in the absence of magnet 238, then lower barbed legs 236 at their laterally inward extension terminate as shown at 236a beneath sidewall 102 of cage 82, and do not extend further laterally inwardly as shown at 237 below sidewall 98 of piston 80. The emergency service kit provided by auxiliary cap 234 includes auxiliary magnetic actuation member 238 positionable to effect magnetic coupling to piston 80 independently of the noted installation conditions, to cause movement of piston 80 to the noted first upward position even if the filter is in the noted second installation condition. The mechanical stop at 237 blocks downward movement of piston 80 to the noted second lower position after movement of the piston to the first upper position in response to auxiliary magnetic actuation member 238. In an alternative embodiment, if it is desired to position magnet 238 closer to piston 80 to ensure sufficient magnetic coupling, or to enable a smaller magnet, to attract piston 80 upwardly prior to lateral inward movement of barbs 237 into apertures 112, the shelf or ledge portion 234a may be deleted, as shown at dashed lines 234b, and magnet 238 is initially placed on top of cage 82, and then clip-on cap 234 is slid downwardly along the cage, with barbs 237 snapping laterally inwardly into apertures 112 beneath piston 80, whereafter magnet 238 may be left in place or may be removed through the now vacated shelf area 234a. Auxiliary cap 234 is mounted to cage 82 and positions magnet 238, with or without shelf 234a, to effect magnetic coupling to piston 80 to cause upward movement of piston 80 to its upward first position. It is preferred that auxiliary cap 234 be mounted to cage 82 in clip-on relation by the noted one or more barbed legs 236 having the noted inner edges or barbs 237 gripping the cage at apertures 112. The one or more barbed legs 236 extend at barbs 237 into the path of movement of piston 80 and provide a mechanical stop blocking movement of piston 80 downwardly to the second lower position after the noted upward magnetically attracted movement of piston 80 to its upper first position in response to auxiliary magnetic actuation member 238. Auxiliary magnetic actuation member 238 is removable from cap 234 after piston 80 is moved upwardly to its first position in response to attraction to magnet member 238, whereafter piston 80 remains in its first upward position as blocked by the noted mechanical stop provided by inner edges or barbs 237, even after removal of magnet 238.

Figure 26:
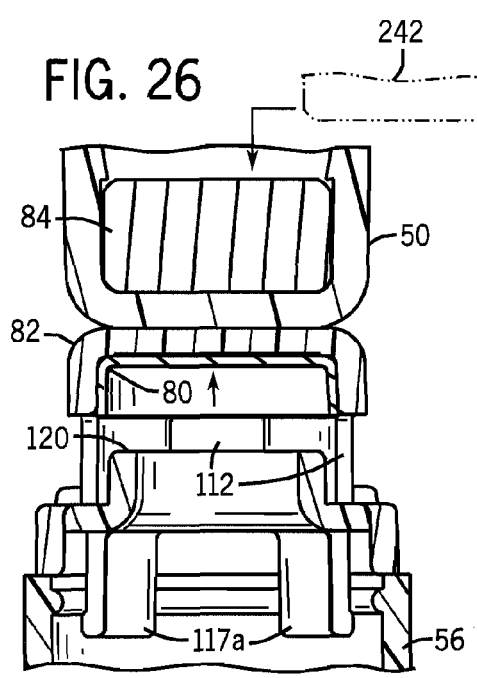
FIG. 26 is like FIG. 3 and shows another embodiment.
Figure 27:
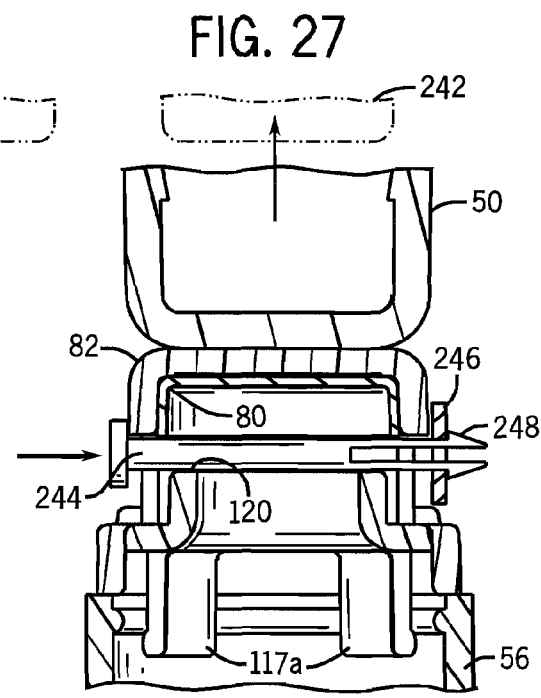
FIG. 27 is like FIG. 3 and shows another embodiment.

FIG. 26 shows a further embodiment and uses like reference numerals from above where appropriate to facilitate understanding. An auxiliary magnet as shown in dashed line at 242 may be brought into close proximity to magnet 84 to add magnetic field strength to attract piston 80 upwardly, in the event magnet 84 becomes insufficient or becomes dislodged or absent or lost, FIG. 27. Auxiliary magnet 242 may be left in place which in combination with magnet 84 retains piston 80 in its upward position. Alternatively or additionally, a pin 244, FIG. 27, may be laterally inserted through cage apertures 112 and held therein by washer 246 through which barbs 248 are snap-fit. Pin 244 retains piston 80 in its upward position. In one implementation, pin 244 is used without magnet 84 and/or without magnet 242, for example a temporary magnet may be placed on top of cage 82, attracting piston 80 to its upward open position, followed by installation of pin 244, whereafter the temporary magnet may be removed, leaving piston 80 in its upward open position, FIG. 27, and holding piston 80 in its upward open position whether or not a magnet is present. Pin 244 provides a mechanical stop blocking movement of piston 80 downwardly to its second lower position after the noted upward movement of piston 80 to its first upward position in response to auxiliary magnetic actuation member 242. Pin 244 is inserted through apertures 112 in cage 82 and holds piston 80 in its upward first position, even upon removal of magnet 242. Pin 244 has deflectable barbs 248 snap-fit through washer 246 to retain pin 244 on cage 82.

FIGS. 28, 29 show a further embodiment and use like reference numerals from above where appropriate to facilitate understanding. Cage 82a is snap-fit mounted to cage-holder and mounting member 117b which is snap-fit mounted to standpipe 56 at the upper end thereof. Magnet 180 is biased upwardly by spring 182. In the noted first installation condition, magnet 180 is moved downwardly by post 184 to the actuated position shown in FIG. 28. The non-actuated upper position of magnet 180 is shown in FIG. 29, e.g. in the absence of post 184. In the noted actuated position of magnet 180, FIG. 28, piston or ball 172 is magnetically attracted upwardly to its noted first position permitting fluid flow through opening 117c in member 117b and then through duct or standpipe 56 to filter outlet 40. In the non-actuated position of magnet 180, as shown at the upward position of the magnet in FIG. 29, the magnetic coupling is insufficient and there is insufficient magnetic force to attract piston or ball 172 upwardly, and hence piston or ball 172 moves to its noted second position by gravity, closing or at least partially closing the valve seat at opening 117c. Magnet 180 is biased by resilient biasing member 182 away from the lower actuated position of FIG. 28 to the upper non-actuated position of FIG. 29. Piston or ball 172 has a piston travel stroke 252 between its noted first and second positions, FIGS. 28 and 29, respectively. Magnet 180 has a magnet travel stroke 254 between its actuated and non-actuated positions, FIGS. 28 and 29, respectively. In one embodiment, in an important dimensional relationship, magnet travel stroke 254 is at least 1.5 times greater than piston travel stroke 252. In the various noted embodiments having resilient biasing members provided by springs such as 182, 256, it is preferred that such springs be of non-magnetic material, e.g. a composite material, stainless steel, etc., so as to not adversely affect the magnetic field of the respective magnet.

In a further embodiment, a resilient biasing member is provided to bias the piston to the noted second downward position, for example as shown in dotted lines at resilient biasing spring 256 in FIG. 4. The bias of spring 256 is selected such that magnetic coupling in the noted first installation condition provides magnetic force on piston 80 greater than the biasing force on the piston provided by resilient biasing member 256. The use of spring 256 may be desirable to fully close valve seat 120 or otherwise engage such valve seat despite resistance due to binding or adhesion of the piston 80 along its guide track during its downward movement.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A filter with installation integrity comprising a housing containing a filter element, said housing having an inlet and an outlet and defining a fluid flow path through said filter element between said inlet and said outlet, said filter having a first installation condition providing desired filter integrity, and having a second installation condition, said fluid flow path including a fluid flow duct having a magnetically biased piston movable between a first position permitting fluid flow through said duct between said inlet and said outlet, and a second position at least partially blocking fluid flow through said duct between said inlet and said outlet, wherein said piston is in said first position when said filter is in said first installation condition, and wherein said piston is in said second position when said filter is in said second installation condition,
- wherein, said duct comprises a cage supporting and guiding said piston for movement between said first and second positions;
- one of said housing, said filter element and said cage has a magnetic actuation section proximate to and magnetically coupled to said piston when said filter is in said first installation condition, with magnetic coupling providing sufficient magnetic force to move said piston to said first position;
- said magnetic coupling is missing in said second installation condition, whereby there is insufficient magnetic force to move said piston to said first position,
- wherein, said magnetic actuation section comprises a magnet; said piston comprises magnetically permeable material,
- wherein, said magnet is movably mounted to said cage, and in said first installation condition is moved to an actuated position proximate to and magnetically coupled to said piston.

2. The filter according to claim 1 wherein said magnetically permeable material is ferromagnetic material.

3. The filter according to claim 1 comprising a resilient biasing member biasing said magnet away from said actuated position.

4. The filter according to claim 3 wherein:
- said magnet is biased by said resilient biasing member away from said actuated position to a non-actuated position;
- said piston has a piston travel stroke between said first and second positions;
- said magnet has a magnet travel stroke between said actuated and non-actuated positions;
- said magnet travel stroke is at least 1.5 times greater than said piston travel stroke.

5. The filter according to claim 1 wherein:
- said piston comprises a magnet;
- said magnetic actuation section comprises magnetically permeable material.

6. The filter according to claim 1 wherein:
- said filter is a fuel filter for an internal combustion engine;
- said piston in said second position permits limited fuel flow through said duct to said engine to permit limp-home and degraded operational performance of the latter.

7. The filter according to claim 1 wherein:
- said filter element is an annular member having a hollow interior; said duct comprises a standpipe in said hollow interior; said standpipe has an end terminating in said hollow interior; said cage and said piston are at said end of said standpipe.

8. The filter according to claim 7 wherein:
- said standpipe extends axially along an axis in said hollow interior of said filter element; and
- said piston moves axially between said first and second positions as guided by said cage.

9. The filter according to claim 8 wherein said piston is magnetically biased to said first position, and is gravitationally biased to said second position.

10. The filter according to claim 1 wherein said piston is a sphere.

11. The filter according to claim 1 comprising an emergency service kit comprising an auxiliary magnetic actuation member positionable to effect magnetic coupling to said piston independently of said installation conditions, to cause movement of said piston to said first position even if said filter is in said second installation condition.

12. The filter according to claim 1 wherein: said filter element is a replaceable filter element; said housing is closed by a removable cover; said second installation condition is selected from the group consisting of:
- improper alignment of said filter element relative to at least one of said housing and said cover;
- an incorrect replacement filter element;
- absence of a filter element;
- an incorrect cover.

13. An emergency service kit for a filter with installation integrity, said filter having a housing containing a filter element, said housing having an inlet and an outlet and defining a fluid flow path through said filter element between said inlet and said outlet, said filter having a first installation condition providing desired filter integrity, and having a second installation condition, said fluid flow path including a fluid flow duct having a magnetically biased piston movable between a first position permitting fluid flow through said duct between said inlet and said outlet, and a second position at least partially blocking fluid flow through said duct between said inlet and said outlet, said piston being in said first position when said filter is in said first installation condition, said piston being in said second position when said filter is in said second installation condition, said duct having a cage supporting and guiding said piston for movement between said first and second positions, one of said housing, said filter element and said cage having a magnetic actuation section proximate to and magnetically coupled to said piston when said filter is in said first installation condition, with magnetic coupling providing sufficient magnetic force to move said piston to said first position, said magnetic coupling being missing in said second installation condition, with insufficient magnetic force to move said piston to said first position, said emergency service kit comprising an auxiliary magnetic actuation member positionable to effect magnetic coupling to said piston independently of said installation conditions, to cause movement of said piston to said first position even if said filter is in said second installation condition, wherein said emergency service kit comprises an auxiliary cap mounted to said cage and positioning said auxiliary magnetic actuation member to effect said magnetic coupling to said piston to cause said movement of said piston to said first position.

14. The emergency service kit according to claim 13 wherein said auxiliary cap is mounted to said cage in clip-on relation by one or more barbed legs gripping said cage.

* * * * *